March 1, 1966 G. F. MINKA 3,238,357

PHOTO-RESPONSIVE CLOCK FOR CARD READER

Filed Aug. 28, 1961 3 Sheets-Sheet 1

INVENTOR:
George F. Minka
By Louis A. Kline
John J. Matlago
Nathan Cass
His Attorneys INVENTOR:
George F. Minka
By Louis A Kline
John J. Matlago
Nathan Cass
His Attorneys March 1, 1966 G. F. MINKA 3,238,357

PHOTO-RESPONSIVE CLOCK FOR CARD READER

Filed Aug. 28, 1961 3 Sheets-Sheet 3

INVENTOR:
George F. Minka
Louis A. Kline
By John T. Matlago
Nathan Cass
His Attorneys

United States Patent Office 3,238,357

Patented Mar. 1, 1966

3,238,357

PHOTO-RESPONSIVE CLOCK FOR CARD READER

George F. Minka, Gardena, Calif., assignor to The National Cash Register Company, Dayton, Ohio, a corporation of Maryland Filed Aug. 28, 1961, Ser. No. 134,320

6 Claims. (Cl. 235—61.11)

This invention relates generally to card readers for reading data from data-bearing cards, which data may then be fed to a computer or other related device. More particularly, this invention relates to a photo-responsive clock for such a card reader which provides for the generation of clock pulses having an accurate synchronized relationship with respect to data positioned on the card.

In using card readers, a problem arises in providing clock pulses which are accurately synchronized with respect to data positioned on each card as the card traverses a reading station. As is well known, the provision of synchronized clock pulses is of considerable importance in a card reader in order to permit the data which has been read from the card to be accurately located and identified for further use. However, the problem of providing such synchronized clock pulses is complicated by the fact that the card handling equipment employed on many card readers causes the card to travel past the reading station at a variable rate. Thus, an external clock generator which is synchronized at the beginning of the passage of a card past the reading station cannot be relied on to be synchronized with data provided on other portions of the card.

As an illustration of the above problem, it will be appreciated that, for conventional punched cards having punched data positioned thereon in discrete columns parallel to the short edge of the card, the columns will pass the reading station at a variable rate. Thus, an external clock generator which is caused to be in synchronism with the initial columns on the card as they pass the reading station will not be in synchronism with later columns on other portions of the card.

While various approaches have been taken towards a solution of the above problem, these approaches are either highly expensive and complex, or else, are impractical. For example, one solution to the problem has been to provide a special punched clock channel on the card such that each column of data on the card has a punched hole in response to which synchronized clock pulses can be accurately provided as each column passes the reading station. However, besides reducing the data which can be provided on each card, this approach has the further disadvantage that many types of cards are not provided with a punched clock channel and, thus, such cards could not be read by a card reader employing this approach.

Another approach employed in the prior art as a solution to this problem has been to print a special clock channel on the long edge of each card consisting of alternating black and white bars whose positioning corresponds to respective columns on the card. A photosensitive detection means is then positioned so as to detect these alternating bars as the card travels past the reading station, and thereby generate clock pulses in response thereto which will be in synchronism with the columns of punched data on the cards. However, the provision of such a printed channel on each card increases the expense thereof and, like the previous punched clock channel approach, limits the card reader for use with cards on which such a printed clock channel is provided.

Accordingly, it is the broad object of this invention to provide improved clock means for a card reader.

Another object of this invention is to provide photosensitive clock means for a card reader which permits clock pulses to be generated which are accurately synchronized with the data on each card, without requiring special markings, channels or other modifications on the cards to be used therewith.

A further object of this invention is to provide the means of the aforementioned objects in relatively simple and inexpensive form.

In a typical embodiment of the invention in which the above objects are achieved, the card platform of the card reader across which each card passes is modified so that one of the long edges thereof is provided with a plurality of apertures arranged so as to be sequentially uncovered as each card travels through the reading station, the location of the apertures being chosen to accurately correspond to the positioning of respective columns on each card. A fluorescent lamp is then used to illuminate the apertures and a plurality of photo-voltaic cells are aligned beneath the apertures so as to receive a stepwise increasing exposure to the fluorescent light as the apertures are uncovered in the traversal of each card past the reading station. The signals thus generated in the photo-voltaic cells are then fed to clock electronics where they are differentiated and formed into clock pulses which are in synchronism with the passing of respective columns past the reading station.

The specific nature of the present invention as well as other advantages, objects and uses thereof will become apparent to those skilled in the art as disclosure is made in the following detailed description of a typical embodiment of the invention illustrated in the accompanying drawings in which:

FIG. 1 is a simplified schematic view of an embodiment in accordance with the invention;

FIG. 1*a* shows a typical data-bearing card which may be employed in the embodiment of FIG. 1;

Like numerals designate like elements throughout the figures of the drawing.

Figures 1, 1A:
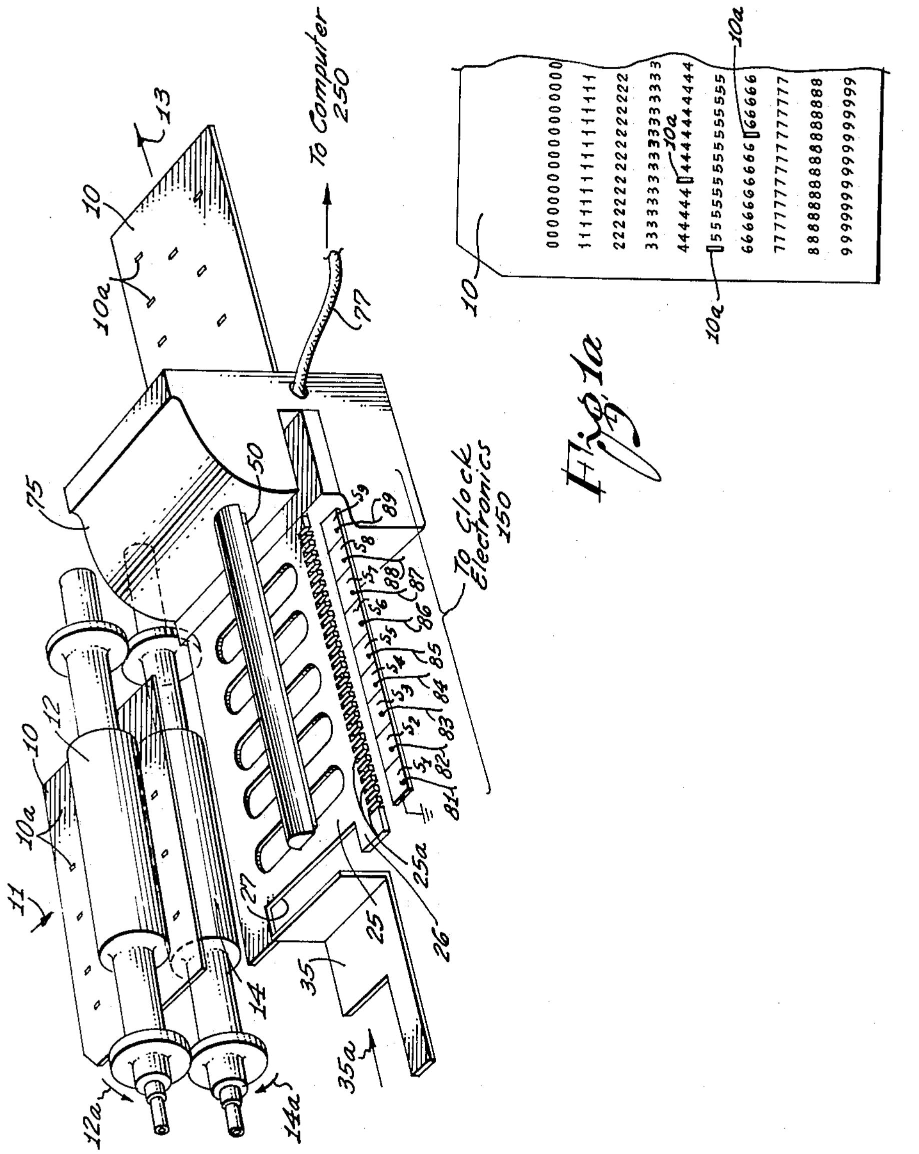

Referring first to FIG. 1, a simplified schematic view is illustrated of the pertinent parts of a conventional card reader and their modification in accordance with the invention. The simplified schematic form is used for illustration in FIG. 1 in order to permit the present invention to be clearly shown and understood without being confused by supporting parts and auxiliary equipment whose structures are not a part of the present invention. It will be appreciated, of course, that these omitted supporting parts and auxiliary equipment may readily be provided by those skilled in the art in view of the various types of card readers already available commercially.

In FIG. 1, a typical punched card 10 is shown being fed in the direction indicated by arrow 11 to a card platform 25 by means of rollers 12 and 14 rotating in the directions indicated by the arrows 12*a* and 14*a* adjacent thereto. The card 10 may be any of various types commercially available, such as illustrated in FIG. 1*a*, on which an item of data is represented by a punched hole in a particular position of a column, such as the punched hole 10*a* illustrated in the 5 position of the first (most left) column in FIG. 1*a*.

After the card 10 is guided onto the card platform 25, it is passed to a reading station 75 for column-by-column reading as a result of the action of a pusher arm 35 which is caused to travel into a recess 27 in the card platform 25, as indicated by the arrow 35*a*, to push the card 10 resting on the platform 25 into the reading station 75. The reading station 75 is constructed and arranged in a conventional manner to optically read the punched items of data in each column as the card 10 is passed therethrough, the signals obtained for each column being fed by way of line 77 to a utilization device, such as a computer 250. Rollers (not shown), similar to those illustrated at 12 and 14 for feeding the card 10 to the platform 25, may also be provided in the reading station 75 to feed out each card 10, as illustrated by the arrow 13. The above-described sequence of events is, of course, repeated for each card to be read and the manner in which this is accomplished as well as the auxiliary equipment required therefor may be of conventional form.

So far, this description has been concerned with the conventional operation of a card reader and, accordingly, clock pulses could also be generated in a conventional manner so as to be in synchronism with the data signals read by the reading station 75 for each column of the card 10. For example, a clock channel comprising a row of punched holes could be provided on card 10 so that a punched hole is present for every column, as described previously. However, in accordance with the present invention and as now will be explained with reference to FIGS. 1 to 3, improved photo-responsive clock means are advantageously provided in accordance with the invention which permit the accurate generation of synchronized clock pulses without the need for any punched holes, or other modifications on the cards.

Figure 2:
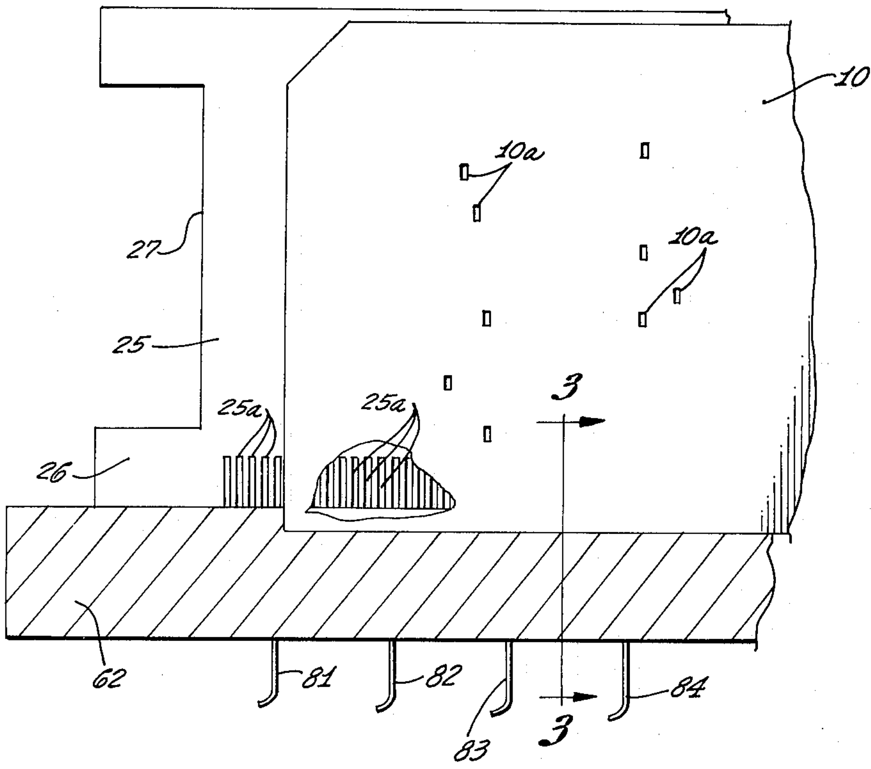
FIG. 2 is a fragmentary cross-sectional top view of an embodiment in accordance with the invention taken along the line 2—2 in FIG. 3.
Figure 3:
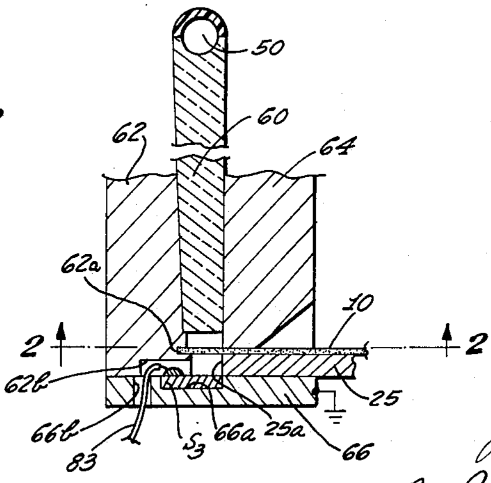
FIG. 3 is a fragmentary cross-sectional end view showing further details of an embodiment in accordance with the invention taken along the line 3—3 in FIG. 2.

Still referring to FIGS. 1 to 3, it will be seen that the card platform 25 is modified so that a plurality of apertures, as illustrated at 25*a*, are provided along a long edge 26 of the platform 25. The number of apertures 25*a* is chosen equal to the number of columns on the card 10 with each aperture 25*a* corresponding to a respective column of the card 10. Also, the spacing between adjacent apertures 25*a* is chosen equal to the spacing between adjacent columns, and the apertures are positioned so that each aperture will be uncovered by card 10 as its respective column on card 10 is being read by the reading station 75. Thus, for a typical punched card 10 having eighty columns, 80 apertures will be provided with a spacing and positioning accurately corresponding to the spacing and positioning of the 80 columns on the card 10.

The apertures 25*a* thus provided on the long edge 26 of platform 25 are illuminated by a fluorescent lamp 50, and a plurality of photo-voltaic cells $S_1$, $S_2$, . . . $S_9$ are aligned beneath these apertures 25*a* along the length thereof as shown in FIGS. 1 and 3. These photo-voltaic cells $S_1$ to $S_9$ may be of the silicon N–P type, each of which acts as a current source when illuminated. The nine photo-voltaic cells $S_1$ to $S_9$ are connected so that one side of each cell is connected to circuit ground and the other side is connected to an output lead, such as indicated in FIG. 1 at 81, 82, . . . 89 for cells $S_1$, $S_2$, . . . $S_9$, respectively. Since there are 80 apertures, the cells $S_1$ to $S_9$ may conveniently be arranged so that each of the first eight cells $S_1$ to $S_8$ is aligned beneath nine of the apertures 25*a*, while the ninth cell $S_9$ is aligned beneath eight apertures.

Referring now to FIG. 3, in particular, which shows further details of a typical structure in accordance with the invention, it will be seen that a glass light guide 60 is sandwiched between opaque members 62 and 64 to guide the light from the fluorescent lamp 50 to the apertures 25*a*, the members 62 and 64 serving to prevent other external illumination from reaching the apertures 25*a*. The glass light guide 60 as well as members 62 and 64 extend along the entire length of the fluorescent lamp 50. Besides serving to block out external illumination, member 62 also provides a longitudinal card groove 62*a*, which serves as a guide for card 10 as it passes across platform 25 in its traversal through reading station 75. Member 62 additionally has an opening 62*b* to provide space for the connection of each of the cells $S_1$ to $S_9$ to its respective leads 81 to 89 as shown for cell $S_3$ and its lead 83 in FIG. 3.

Still referring to FIG. 3, it will be seen that a metal base member 66, located below platform 25 and extending the full length along apertures 25*a*, provides a recess 66*a* in which the photo-voltaic cells $S_1$ to $S_9$ are disposed, such as by cementing. Member 66 also provides an opening 66*b* through which leads 81 to 89 connected to respective cells $S_1$ to $S_9$ may be passed, as illustrated for cell $S_3$ and its lead 83 in FIG. 3. In addition, since metal base member 66 is connected to circuit ground, it further serves to ground the other side of each of cells $S_1$ to $S_9$.

Before leaving FIGS. 1 to 3, it may be noted that member 62 shown in FIGS. 2 and 3 and members 60, 64, and 66 shown in FIG. 3 have been omitted from the simplified schematic of FIG. 1. This has been done in order to permit the apertures 25*a* and the cells $S_1$ to $S_9$, along with their respective leads 81 to 89, to be clearly shown in FIG. 1, since this figure is intended to basically illustrate the overall card reader structure.

Figures 4, 5:
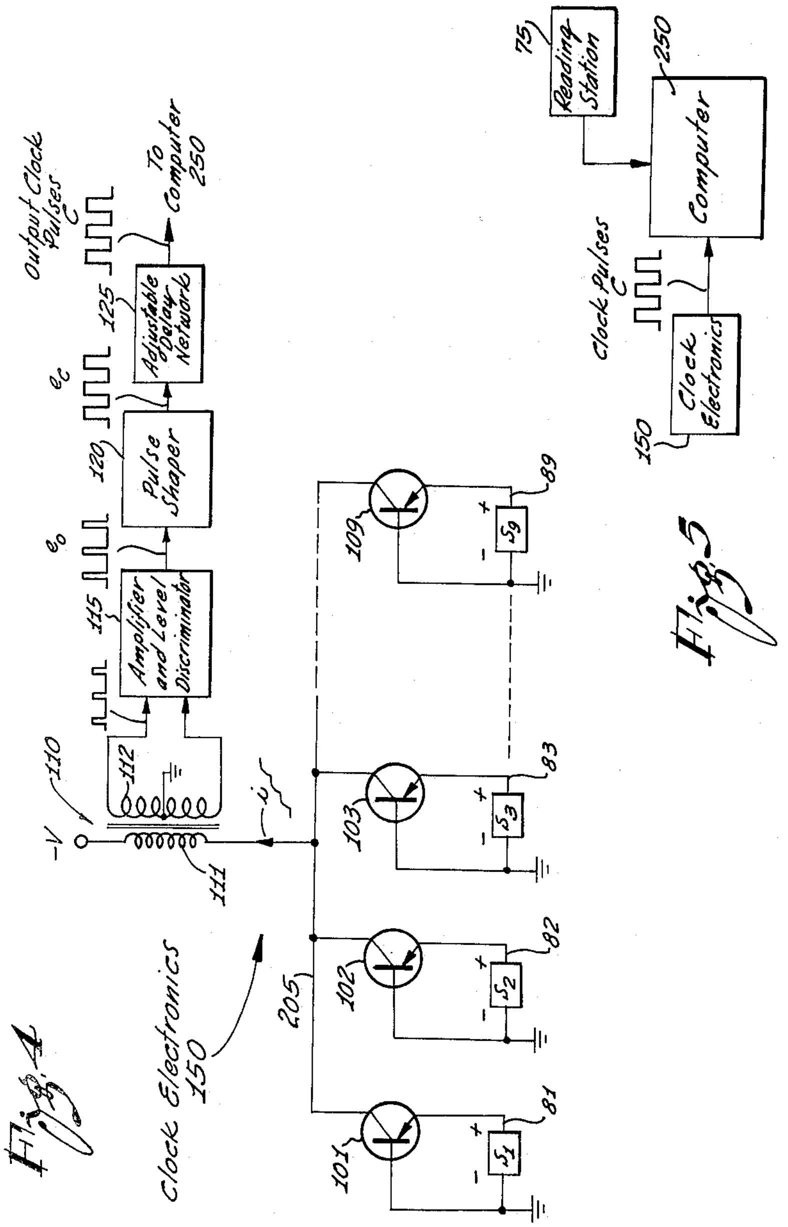
FIG. 4 is an electrical block and circuit diagram of a typical embodiment of clock electronics for use in conjunction with the structural embodiment illustrated by FIGS. 1 to 3.
FIG. 5 is an electrical block diagram showing generally how the clock pulses provided in accordance with the invention are fed to a computer in synchronism with the signals obtained from the reading station.

Having described the basic structure of an embodiment in accordance with the invention, attention is next directed to FIG. 4 which illustrates a typical embodiment of clock electronics 150 which may be employed in conjunction with the structure illustrated by FIGS. 1 to 3. While only the four cells $S_1$, $S_2$, $S_3$, and $S_9$ are specifically shown in FIG. 4, it will be understood that the other cells are connected in a like manner.

It will thus be evident from FIG. 4 that each of the photo-voltaic cells $S_1$ to $S_9$ is connected between the base and emitter of a respective one of the PNP transistors 101 to 109, the negative side of each photo-voltaic cell being connected to the base of its respective transistor, which is also circuit ground, while the positive side of each cell is connected to the emitter of its respective transistor. The polarities indicated for the photo-voltaic cells in FIG. 4 represent the polarity of the voltage produced by each cell in response to illumination. The collectors of transistors 101 to 109 in FIG. 4 are all connected to a common line 205 which in turn is connected to one end of the primary winding 111 of a transformer 110, the other end of the primary winding 111 being connected to a suitable negative voltage source —V.

From the previous description it will be remembered that, as a card 10 in FIGS. 1 to 3 slides across platform 25 in its traversal past the reading station 75, the apertures 25*a* will be sequentially uncovered, one by one, the positioning and spacing of the apertures 25*a* being such that as each aperture is uncovered by card 10, its respective column is being read by reading station 75. Thus, in FIG. 4, it will be understood that the output current *i* passing through the primary winding 111, which is the sum of the currents in all the collectors of transistors 101 to 109, will increase in stepwise fashion from a minimum value when all of the apertures 25*a* are covered by car 10 to a maximum value when all of the apertures 25*a* are uncovered, a ramp of current being obtained at each aperture. Consequently, the current *i* waveform will have the general staircase form illustrated in FIG. 4, the width of each of the apertures 25*a* being chosen in conjunction with the speed of movement of a card 10 across platform 25 so as to provide suitable rise time characteristics for the current *i* waveform.

It will be noted that it might conceivably be possible to eliminate the transistors 101 to 109 and connect all of the photo-voltaic cells in parallel. However, because of the varying range in characteristics between cells and the difficulty in matching these characteristics for parallel operation, it is highly advantageous to make use of the transistor arrangement shown in FIG. 4, in which case each cell operates independently and maximum utilization of the cells is thereby made possible. Also, it is advantageous to choose the spectral response of the photo-voltaic cells $S_1$ to $S_9$ so that it peaks in the region of the peak of the light output from the fluorescent lamp 50. For example, it is possible to employ a fluorescent lamp and photo-voltaic cells which peak at 5700 and 8300 angstroms, respectively, the cell response at 5700 angstroms being 65% of its peak response at 8300 angstroms.

Continuing with the description of the clock electronics 150 shown in FIG. 4, the current $i$ flowing in the primary winding 111 of transformer 110 produces a signal $e$ in the grounded center-tapped secondary winding 112. Because of the differentiating action of transformer 110, $$e=L\frac{di}{dt}$$

where L is the effective inductance appearing to the current $i$), the output signal $e$ waveform appearing across the secondary winding 112 will be the differential of the staircase waveform of current $i$. The signal $e$ will thus consist of pulses, each of which is initiated at the beginning of its respective aperture 25*a*, and has a duration dependent upon the speed of movement of the card 10 and the width of each aperture 25*a*.

The signal $e$ output thus developed across secondary winding 112 of transformer 110 is fed to an amplifier 115, which may be of conventional form, for amplifying the signal $e$ and for providing level discrimination to eliminate noise. The resulting signal $e_0$ is then fed to a pulse shaper 120 which acts on the signal $e_0$ to produce a clock pulse signal $e_c$ whose pulses have the required clock pulse shape.

The resulting clock pulse signal $e_c$ from pulse shaper 120 is next fed to an adjustable delay network 125 which can be adjusted to introduce any delay into the clock pulse signal $e_c$ so as to provide clock pulses C which are in exact synchronism with the data signals obtained as each respective column traverses the reading station 75. If desired, the positioning of the apertures 25*a* provided in platform 25 could be chosen so that there is a predetermined built-in delay between a clock pulse and its respective column, the delay network 125 then being adjusted to provide the delay required to achieve exact synchronism. Also, by making delay network 125 adjustable, it is possible to adjust the delay for different types of cards whose columns may be positioned differently.

Referring now to FIG. 5, the use of the photo-responsive clock of the present invention is illustrated in general form. The clock pulses C obtained from the clock electronics 150 are fed to a computer 250 (or other utilization device) along with the input data signals obtained from reading station 75. Since it can be assured that the clock pulses C are in exact synchronization with the input data signals because of the action of the photo-responsive clock of the present invention, as described above, the data read off the card can be conveniently and accurately utilized by the computer 250 for whatever purposes are necessary in performing computer operations.

It is important to note in connection with the above disclosure that accurate synchronization between the clock pulses generated in accordance with the invention and the data signals read from respective columns of the card 10 will be maintained even though the card traverses the reading station 75 at a variable rate, since the uncovering of the apertures 25*a* is dependent only on the position of the card and not on its rate of travel. It is also important to note that, in accordance with the present invention, no special markings or other modifications are required of the cards in order to achieve this synchronization.

It is to be understood that the embodiments described herein are only exemplary and that various modifications may be made in the construction, arrangement, operation, and uses thereof without departing from the principles of the present invention. For example, instead of using the single transformer 110 as shown in FIG. 4, each of the transistors 101 to 109 could be provided with a separate transformer, and the differentiated outputs of the transformers then summed to obtain the composite signal from which synchronized clock pulses can be produced. The above example is only typical and the present invention should be considered as including all modifications and variations coming within the scope of the invention as defined in the appended claims.

What is claimed is:

1. In a card reader for reading data-bearing cards of generally rectangular shape, said cards having a plurality of columns substantially parallel to the short side of said card, in which data can be provided, a card platform of generally rectangular shape on which each card is placed in rectangular conformance therewith prior to reading, a reading station adjacent a short end of said platform, means for causing said card to move across said platform substantially along the long dimension thereof so that the columns on said card sequentially traverse said reading station, said platform having a plurality of apertures positioned along the long dimension thereof and spaced in accordance with the columns on said card so that at least a plurality of said apertures are uncovered in a predetermined relationship with respect to the traversal of the columns on each card past said reading station, a radiation source provided on one side of said apertures for illuminating said apertures as they are uncovered by said card, radiation sensitive means provided on the other side of said apertures for receiving the radiation from said source which passes through said apertures and for producing electrical signals in response thereto, said radiation-sensitive means comprising a plurality of photo-voltaic cells arranged contiguously side by side so as to extend the full length of said plurality of apertures, each photo-voltaic cell acting as a current source in response to illumination from said radiation source and being sufficiently long so as to receive radiation from at least five of said apertures which are different for each cell, and electrical circuit means to which said electrical signals are fed for producing clock pulses having a predetermined relationship with respect to the traversing of the columns on said card past said reading station, said electrical circuit means comprising a separate transistor amplifier to which the output of each cell is fed and means for combining the outputs of said amplifiers for producing said clock signals.

2. The invention in accordance with claim 1, wherein the number of said apertures is equal to the number of columns on each card, wherein the spacing between apertures is equal to the spacing between said columns, and wherein the positioning of said apertures is such that each aperture is uncovered as its respective column is being read by said reading station.

3. The invention in accordance with claim 2, wherein said apertures are provided along one edge of a long dimension of said platform.

4. In a card reader for reading data-bearing cards of generally rectangular shape, said cards having a plurality of columns substantially parallel to the short side of said card, in which data can be provided, a card platform of generally rectangular shape on which each card is placed in rectangular conformance therewith prior to reading, a reading station adjacent a short end of said platform, means for causing said card to move across said platform substantially along the long dimension thereof so that the columns on said card sequentially traverse said reading station, said platform having a plurality of apertures positioned along the long dimension thereof and spaced in accordance with the columns on said card so that at least a plurality of said apertures are uncovered in a predetermined relationship with respect to the traversal of the columns on each card past said reading station, a radiation source provided on one side of said apertures for illuminating said apertures as they are uncovered by said card, radiation sensitive means provided on the other side of said apertures for receiving the radiation from said source which passes through said apertures and for producing electrical signals in response thereto, said radiation-sensitive means comprising a plurality of photo-voltaic cells arranged contiguously side by side so as to extend the full length of said plurality of apertures, each photo-voltaic cell acting as a current source in response to illumination from said radiation source and being sufficiently long so as to receive radiation from at least five of said apertures which are different for each cell, and electrical circuit means to which said electrical signals are fed for producing clock pulses having a predetermined relationship with respect to the traversing of the columns on said card past said reading station, said electrical circuit means including a separate transistor amplifier to which the output of each cell is fed, said electrical circuit means also including means for combining the outputs of said amplifiers and for differentiating the output signals therefrom and for forming the differentiated electrical signals into clock pulses which are in synchronism with the reading of the columns on each card by said reading station.

5. In a card reader for reading data-bearing cards of generally rectangular shape, said cards having a plurality of columns substantially parallel to the short side of said card in which data can be provided, a card platform of generally rectangular shape on which each card is placed in rectangular conformance therewith prior to reading, a reading station adjacent a short end of said platform, means for causing said card to move across said platform substantially along the long dimension thereof so that the columns on said card sequentially traverse said reading station, said platform having a plurality of apertures positioned along the long dimension thereof and spaced in accordance with the columns on said card so that at least a plurality of said apertures are uncovered in a predetermined relationship with respect to the traversal of the columns on each card past said reading station, a radiation source provided on one side of said apertures for illuminating said apertures as they are uncovered by said card, radiation sensitive means provided on the other side of said apertures for receiving the radiation from said source which passes through said apertures and for producing electrical signals in response thereto, said radiation-sensitive means comprising a plurality of photo-voltaic cells arranged contiguously side by side so as to extend the full length of said plurality of apertures, each photo-voltaic cell acting as a current source in response to illumination from said radiation source and being sufficiently long so as to receive radiation from at least five of said apertures which are different for each cell, and electrical circuit means to which said electrical signals are fed for producing clock pulses having a predetermined relationship with respect to the traversing of the columns on said card past said reading station, said electrical circuit means including a respective transistor amplifier to which the output of each cell is fed, said electrical circuit means also including a transformer for combining the outputs of said amplifiers and for differentiating the output signals therefrom, means for forming the differentiated electrical signals into pulses, and means for delaying said pulses by an amount which will bring the pulses into synchronism with the reading of the columns on each card by said reading station.

6. In a card reader for reading data-bearing cards of generally rectangular shape, said cards having a plurality of columns substantially parallel to the short side of said card in which data can be provided, a card platform of generally rectangular shape on which each card is placed in rectangular conformance therewith prior to reading, a reading station adjacent a short end of said platform, means for causing said card to move across said platform substantially along the long dimension thereof so that the columns on said card sequentially traverse said reading station, said platform having a plurality of apertures provided along a long edge thereof, the number of apertures being equal to the number of columns on each card, the spacing between apertures being equal to the spacing between said columns, and the positioning of said apertures being such that each aperture is uncovered as its respective column is being read by said reading station, a radiation source provided on one side of said apertures for illuminating said apertures as they are uncovered by said card, radiation sensitive means provided on the other side of said apertures for receiving the radiation from said source which passes through said apertures and for producing electrical signals in response thereto, said radiation-sensitive means including a plurality of adjacent individual photo-voltaic cells extending along the length of said apertures, each cell acting as a current source in response to illumination from said radiation source, and electrical circuit means to which the currents produced by said cells are fed, said electrical circuit means comprising transistor means to which the output signal from each cell is fed to produce an output current representative of the output of its respective element, transformer means to which the sum of the output currents from said transistors is applied for providing an output signal corresponding to the differential of the electrical signals produced by said elements, and means for forming the differentiated output signal provided by said transformer means into clock pulses which are in synchronism with the reading of the columns on each card by said reading station.

References Cited by the Examiner

UNITED STATES PATENTS

| | | | |
|---|---|---|---|
| 2,831,634 | 4/1958 | Luhn | 235—61.11 |
| 3,142,749 | 7/1964 | Larsen | 235—61.11 |

MALCOLM A. MORRISON, *Primary Examiner.*

WALTER W. BURNS, Jr., *Examiner.*